Sept. 29, 1959 J. M. THORSÉN 2,906,825

DEVICE FOR SELECTING AND TRANSFORMING PULSES
IN MULTI-CHANNEL PULSE COMMUNICATION SYSTEMS

Filed Dec. 9, 1954

INVENTOR
JARL MORANNAR THORSÉN
BY [signature]
ATTORNEY

United States Patent Office 2,906,825

Patented Sept. 29, 1959

2,906,825

DEVICE FOR SELECTING AND TRANSFORMING PULSES IN MULTI-CHANNEL PULSE COMMUNICATION SYSTEMS

Jarl Morannar Thorsén, Sodertalje, Sweden, assignor to Telefonaktiebolaget L M Ericsson, Stockholm, Sweden, a corporation of Sweden Application December 9, 1954, Serial No. 474,237

Claims priority, application Sweden December 23, 1953

4 Claims. (Cl. 179—15)

The present invention relates to a device for selecting and transforming pulses in multi-channel pulse communication systems, which operate with time-phase modulated pulses.

In such systems the pulse trains of the different channels are time interspaced with each other and these pulse trains are to be chosen and detected in the receiving device of the system, so that the original communication signals re-appear in the right channels.

A large number of devices for this purpose are known, said devices being generally rather complicated and each requiring a large or small number of electron tubes.

From reliability of operation and maintenance point of view it is desirable to reduce the number of electron tubes in a system, and a particularly great reduction is obtained, if the devices, the number of which is directly proportional to the number of channels, can be simplified.

The present invention relates to a device for selecting from a pulse train containing time-phase modulated pulses belonging to different pulse channels, a channel pulse train belonging to a determined channel and transforming its pulses into duration modulated pulses, said device containing a generator for gate pulses, said pulses arising and lasting during the time intervals, during which the pulses of the wanted channel pulse train may appear, and is mainly characterized by a first diode being connected in series with an impedance between ground and a bias source with such a polarity, that the diode is normally conductive, a source for time-phase modulated pulses, said source being over a bias network connected to one of the electrodes in a second diode, the other electrode of which is connected to the connection point between said first diode and the impedance, whereby the polarity of the last diode is changed in such a manner, that it is normally not-conductive, the invention being further characterized by the gate pulse generator, the pulses of which have a polarity opposite to that of the channel pulses, being over a condenser connected to the connection point between said first diode and the impedance.

Figure 1:
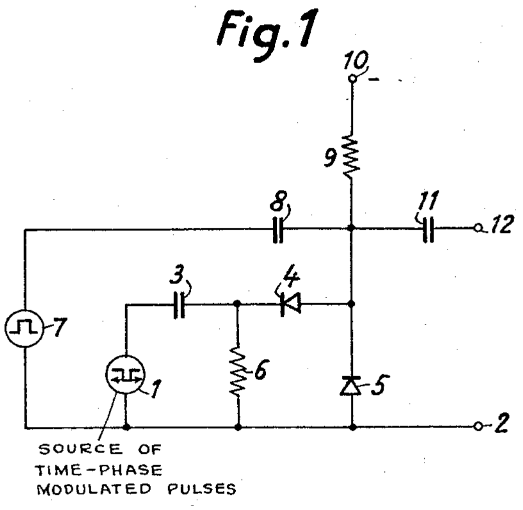
Figure 2:
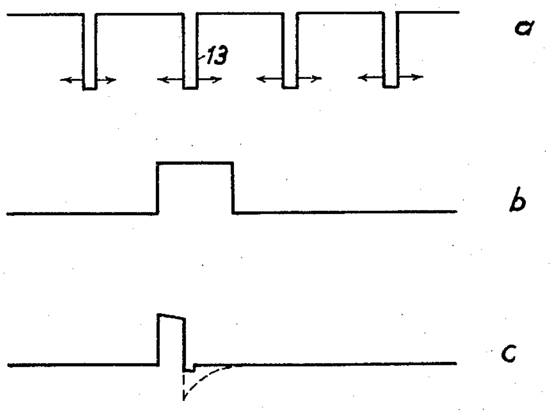

The invention will be described more in detail in connection with the attached drawing, where Fig. 1 shows a device according to the invention and Fig. 2 shows the voltage at different points in the device as a function of the time.

In Fig. 1, 1 designates a source for time-phase modulated pulses belonging to different channels. These pulses are negative as shown in Fig. 2*a*. The pulse source 1 is connected between ground 2 and a condenser 3, which is connected in series with two diodes 4 and 5 with the same polarity direction, the cathode of the diode 4 being connected to the condenser 3 and the anode of the diode 5 being connected to earth. The cathode of the diode 5 and the anode of the diode 4 are interconnected and both diodes are connected in parallel with a resistance 6, which is connected between ground and the cathode of the diode 4. A generator 7 for generating gate pulses is connected with one pole to ground and with the other pole to one of the terminals of a condenser 8, the other terminal of which is connected both to the cathode of the diode 5, and to a voltage source 10 with negative polarity through a resistance 9 and finally to one of the output terminals 12 of the device over a coupling condenser 11. The other output terminal of the device is connected to ground and designated by 2.

The device operates in the following manner: a current flows normally from ground 2 through the diode 5 and the resistance 9 to the negative voltage source 10, so that the diode 5 is conductive. The generator 7 generates gate pulses with positive polarity as shown in Fig. 2*b*. Under these circumstances the gate pulses arise only during the time, during which those pulses in the channel pulse train appear, which are to be chosen and detected. According to Figs. 2*a* and 2*b* only the channel pulse 13 arises at the same time as the gate pulse. When the gate pulse arises the cathode potential of the diode 5 increases, this diode thereby being blocked. Fig. 2*c* shows the cathode potential of the diode 5 as a function of a time. The diode 4 also remains blocked, since its cathode has a bias in relation to ground, said bias exceeding the amplitude of the gate pulse. This bias can be obtained either by the cathode of the diode 4 being over a resistance connected to a voltage source with positive polarity, or in the manner which is shown in the figure and which will be later explained. During the duration of the gate pulse the voltage of the cathode of the diode 5 decreases a little, as shown in Fig. 2*c*. This is depending on the fact that the condenser 8, which has a rather small capacitance, is somewhat discharged by the resistance 9 and the diodes 4 and 5. When the channel pulse then arises the cathide voltage of the diode 4 decreases rapidly and the diode becomes conductive. The cathode voltage of the diode 5 also decreases rapidly, which is made evident in the Fig. 2*c*. The amplitude of the channel pulse is so great, that the cathode potential of the diode 5 is driven towards a negative value in relation to ground, as is indicated from the dashed diagram in Fig. 2*c*. The diode is, however, conductive, so that the potential of its cathode cannot fall considerably below zero (according to the full diagram in Fig. 2*c*). The condenser 8 is now rapidly discharged so that, when the channel pulse 13 disappears, the right terminal of the condenser has such a great negative charge, that the cathode potential of the diode 5 cannot fall considerably below the rest of the gate pulse. The cathode potential of the diode 5 and therewith the voltage over the output terminals of the device are thus given the shape shown in Fig. 2*c*. During the time when the diode 4 is conductive, i.e. the time, during which the channel pulse 13 lasts, the right terminal of the condenser 3 is recharged positively. When said diode is thereafter blocked, its cathode has positive potential in relation to ground. The condenser is slowly discharged through the resistance 6 and the diode 4. The time constant of the discharge circuit is, however, considerably greater than a periode of sequence, i.e. the time interval between two gate pulses following after each other and belonging to the same channel. After a sufficient number of cycles a state of duration has appeared, so that the right terminal of the condenser at the end of the channel pulse 13 has in relation to ground a voltage, which is equal to the sum of the absolute amounts of the amplitudes of the gate pulse and the channel pulse. During a periode of sequence said voltage may not decrease under a value corresponding to the amplitude of the channel pulse, so that other channel pulses are unable to make the diode 4 conductive and reach the output terminal 12 of the device, which would cause cross-talk. All time-phase modulated channel pulses appear over the resistance 6, but since the diode 4 is blocked and the diode 5 conductive at all times, when the pulses of other channels appear, said channel pulses are considerably attentuated before reaching the output terminals. The extent of the crosstalk attenuation is still increased by the right channel pulses appearing at the output terminals being duration modulated, whereas the other channel pulses are already considerably attenuated by the diodes being time-phase modulated. A duration modulated pulse train has, as is well known, considerably greater low frequency energy than a time-phase modulated pulse train at the same amplitude and modulation degree.

The described device is naturally not limited to the described embodiment but may be varied within the scope of the invention. The device may thus be used for instance for separating and transforming time-phase modulated pulses with positive polarity. In that case the generator 7 should generate negative gate pulses, the polarity of the diodes 4 and 5 would have to be changed, and the bias source 10 would have to be positive instead of negative.

I claim:

1. A circuit system for separating from a pulse train of time-phase modulated pulses associated with several pulse channels a channel pulse train associated with a single channel and for transforming the pulses of the separated train into duration modulated pulses, said system comprising generator means having a polarity opposite to that of the channel pulses for generating gate pulses during the interval in which pulses of the channel pulse train to be separated appear, one terminal of said generator means being grounded, a source of a bias potential, a first diode connected between said source and ground, impedance means connected in series between said diode and said bias source, said source having a potential such that the diode is normally conductive, a source of multi-channel, time-phase modulated pulses, one terminal of said source being grounded, a second diode having one electrode connected to another terminal of said source of pulses, bias means included in the connection between said electrode and said source of pulses and connected to ground, the other electrode of the second diode being connected to the junction point between said impedance means and said first diode, the polarity of the second diode being such that the same is normally blocked, capacitance means having one electrode connected to another terminal of said generator means and the other to the junction point between said impedance means and said first diode, and an output terminal connected to the junction point between said bias source and said first diode, said capacitance means being charged by channel pulses included in a discharge circuit having a time factor such that the remaining part of a gate pulse is blocked from reaching said output terminal.

2. A circuit system according to claim 1, wherein said generator means generate pulses having an amplitude lower than that of the time-phase modulated pulses.

3. A circuit system according to claim 1, wherein said bias means comprise capacitance means connected in series with said source of pulses and said one electrode of the second diode, and resistance means connected between junction point of the said one electrode of the second diode and said source of pulses and ground.

4. A circuit system according to claim 1, wherein said diodes are connected to have the same direction of polarity.

References Cited in the file of this patent

UNITED STATES PATENTS

| | | |
|---|---|---|
| 2,657,318 | Rack | Oct. 27, 1953 |
| 2,760,160 | Flood et al. | Aug. 21, 1956 |